Patented July 24, 1934

1,967,649

UNITED STATES PATENT OFFICE 1,967,649

TASTELESS BASIC ALUMINUM ACETYL-SALICYLATE AND METHOD FOR PRODUCING SAME

Emil Wolf, Budapest, Hungary, assignor to firm: Chinoin Gyogyszer Es Vegyeszeti Termekek Gyara R. T./Dr. Kereszti & Dr. Wolf, Ujpest, Hungary No Drawing. Application February 19, 1932, Serial No. 594,145. In Hungary April 15, 1931

3 Claims. (Cl. 260—11)

Up to the present, aluminum derivatives or salts of the acetyl-salicylic acid have not been known. The invention relates to the producing of a basic aluminum acetylsalicylate, which is insoluble in water, nearly tasteless and seems to be very valuable for medicinal use. This substance can be produced in accordance with the invention by provoking a reaction between a soluble salt of acetyl-salicylic acid and any soluble aluminum salt in the presence of a suitable solvent. The basic aluminum salt thus produced shows—independently from the stoichiometric relations of the starting materials—practically constant analysis results, making probable the following structural formula:

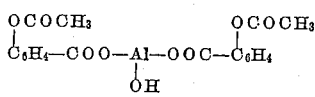

containing 6.71% Al and 29.8% acetic acid, while our actual products contain in the average 6.5–6.6% Al and 28–29% acetic acid. This aluminum salt is insoluble in water, alcohol and ether. Diluted acids or alkalies decompose the new salt, one of the decomposition products being acetyl-salicylic acid or a salt thereof.

The above mentioned new compound can also be obtained in another way, starting from another aluminum salt produced in accordance with the invention. We obtain the latter salt by provoking a reaction between any salt—for example alkali salt—of the acetyl-salicylic acid dissolved in methyl or ethyl alcohol, and an aluminum salt—for example aluminum chloride—dissolved in alcohol. The alcali chloride precipitating from the reaction mixture is separated; the filtered liquid contains probably the normal aluminum salt of the acetyl-salicylic acid in solution. Now this normal salt can be transformed without previous separation into the above specified new compound by mixing the alcoholic liquid with a quantity of water which causes the new compound to precipitate as a white powder.

Examples 1. 360 g acetyl-salicylic acid are dissolved in 3000 cm³ of a normal solution of sodium carbonate and at once mixed with an aqueous solution of 242 g crystallized aluminum chloride. The new basic salt precipitates as a white powder to be separated, washed with water and dried.

2. 404 g of sodium acetyl-salicylate are dissolved in a mixture of 600 g methyl alcohol and 100 g water. While cooling the mixture an aqueous solution of 242 g crystallized aluminum chloride and then a 15% solution of 53 g dry sodium carbonate is added, and the precipitate separated and washed with water.

3. A cold saturated solution of 606 g sodium acetyl-salicylate in methyl alcohol is mixed with a cold saturated methyl alcoholic solution of 242 g crystallized aluminum chloride. Very soon sodium chloride begins to precipitate. The solution filtered off from the sodium chloride is mixed with the same quantity of water and the precipitate separated and washed.

The new compounds are valuable febrifuges and starting materials for chemical synthesis.

What I claim is:

1. A tasteless mono basic aluminum salt of acetyl salicylic acid, insoluble in water, alcohol and ether.

2. A method for producing a tasteless mono basic aluminum salt of acetyl salicylic acid, which comprises reacting between a water solution of 3 equivalent weights of an aluminum salt and a water solution of two equivalent weights of an acetyl salicylic salt in the presence of at least one equivalent weight of alkali metal carbonate.

3. A method for producing a tasteless mono basic aluminum salt of acetyl salicylic acid, which comprises reacting between a water solution of 3 equivalent weights of an aluminum salt and a water solution of two equivalent weights of an acetyl salicylic salt in the presence of at least one equivalent weight of sodium carbonate.

EMIL WOLF.